Figure 1:
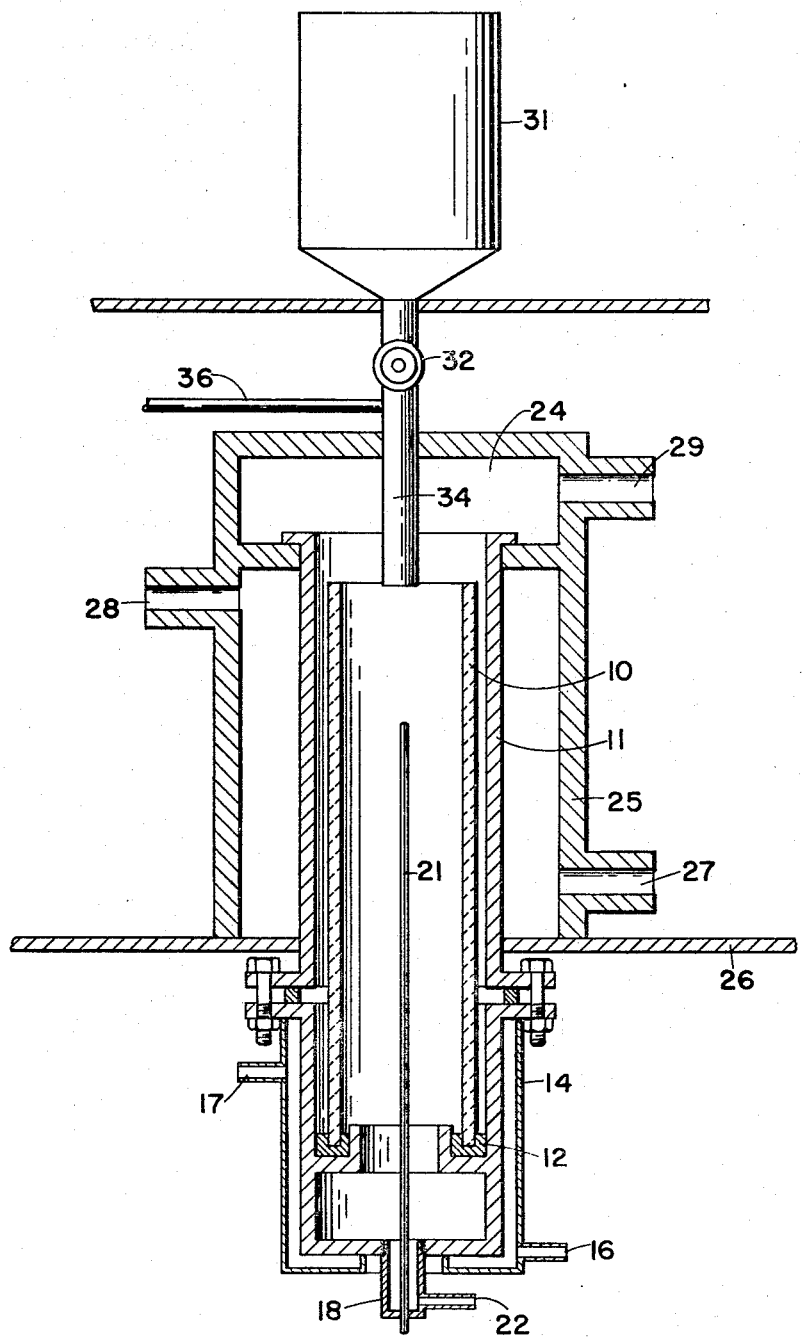

Dec. 20, 1966  A. T. McCORD  3,293,005
PROCESS FOR CHLORINATING OXIDES
Filed April 1, 1964  2 Sheets-Sheet 1

INVENTOR.
ANDREW T. McCORD
BY
*H.W. Brownell*
ATTORNEY

United States Patent Office … 3,293,005
Patented Dec. 20, 1966

3,293,005
PROCESS FOR CHLORINATING OXIDES
Andrew T. McCord, Snyder, N.Y., assignor, by mesne assignments, to the United States of America as represented by the United States Atomic Energy Commission
Filed Apr. 1, 1964, Ser. No. 356,618
3 Claims. (Cl. 23—351)

This application is a continuation-in-part of copending application Serial No. 854,794, filed November 23, 1959.

This invention relates to a method and apparatus for effecting chlorination of refractory oxides, particularly those of zirconium and hafnium. The invention also relates to a pelleted input material to be chlorinated.

Anhydrous zirconium tetrachloride and hafnium tetrachloride are valuable intermediates for the production of zirconium and hafnium metals. Several techniques have been used in the past for producing these tetrachlorides. However each of these previously used methods has certain disadvantages which makes its use commercially unattarctive. Thus, at one time, in the production of zirconium tetrachloride, zircon was converted to the carbide and the carbide then chlorinated. In such a process a mixture of zircon ore and carbon was heated to above 1800° C. in a graphite resistor furnace to form mixed carbides of zirconium and silicon, and the mixed carbides were then chlorinated in a semicontinuous manner to form tetrachlorides of zirconium and silicon, which were then further processed. This method proved to be unacceptable due to the relatively high losses encountered in the production of the carbide in the furnace and the poor chlorine efficiency and low capacity in the chlorinator. Furthermore this type of operation required relatively expensive and high operating costs.

Subsequently a method was developed for direct chlorination of the oxide. According to this method, briquettes approximately 1⅜″ x 1″ x ¾″ in size were formed in contoured rolls from a mixture of zirconium oxide, carbon and a binder. The briquettes were then chlorinated in a relatively large chlorinator, the chlorinator consisting of cylindrical tank with a heavy silica brick lining. Large graphite electrodes were embedded in the lining to supply 3 phase current.

The chlorinator, having an inside diameter of about 30″, was filled with 6 feet of briquettes and heated to an elevated temperature. Chlorine was admitted to the bottom of the reactor. The products leaving the chlorinator generally consisted of gaseous zirconium tetrachloride, carbon monoxide and dioxide, phosgene, hydrochloric acid, unreacted chlorine, numerous volatile metallic chlorides, zirconium oxide and carbon dust. Such a chlorinator produced about 60–65 pounds of zirconium tetrachloride per hour, with a chlorine efficiency of 70–80 percent, which means a loss of from 10 to 20 pounds of chlorine per hour. Since the effective cross section of the briquette bed was about 707 square inches, the production of $ZrCl_4$ ranged from 0.085 to 0.092 pound per square inch per hour.

Such chlorination process was commercially unattractive for a number of reasons. The chlorine efficiency seldom exceeded 75 percent so there always was the problem of disposing of unused chlorine gas. The presence of chlorine in the hot effluent gases dictated a careful choice of materials of construction in the recovery apparatus. The use of an electrically heated briquette bed resulted in high installation and maintenance costs and required a briquette of specific electrical conductivity. Moreover, the making of briquettes in contoured rolls was difficult since the roll contours were broken down rather rapidly and weak, poorly-made briquetes often resulted.

Accordingly, an object of the present invention is to provide a practical and efficient method for the halogenation of refractory oxides.

Another object of the invention is to provide a continuous, thermally autogenic process for the chlorination of refractory oxides.

Another object of the invention is to provide a process for the chlorination of refractory oxides in which there is a high degree of chlorine efficiency so that there is substantially no unreacted chlorine in the product gases.

Another object of the invention is to provide a practical and efficient process for chlorinating refractory oxides that produces chlorides of high purity.

Another object of the invention is to provide a continuous, thermally autogenic chlorination process in which there is substantially complete consumption of reactants so that no residue is formed in the chlorination equipment.

Another object of the invention is to provide a pelleted feed material for use in a process for chlorinating refractory oxides.

Another object is to provide a vertical shaft reactor for the chlorination of refractory oxides.

Other objects and advantages will be apparent from the following description of the invention and the novel features will be particularly pointed out in connection with the appended claims.

In order to attain these objectives and thereby overcome the disadvantages of the previously used chlorination process it has been determined that some way must be found (1) to improve the reaction rate between the refractory oxide and chlorine; (2) to insure substantially complete reaction of all of the reactants, and (3) to conduct the process in such a way that the reaction is thermally autogenic. In addition the reactants for the process should be easily prepared and handled.

It has now been discovered that a refractory oxide, such as zirconium oxide or hafnium oxide, can be chlorinated in a practical, thermally autogenic process, with relatively high capacity and high chlorine efficiency in a vertical shaft reactor in which a static bed of the oxide and carbon in pelleted form is supplied with a stream of chlorine gas that passes upwardly into the bed to react with the pellets in an exothermic reaction to form relatively pure gaseous reaction products, and in which the gaseous reaction products are withdrawn upwardly through the bed to effect heat transfer with the incoming feed pellets prior to recovery of the chloride from the product gases.

Thus, the chlorination of zirconium dioxide, for example, in accordance with the present invention, proceeds according to the following equation at about 900° C:

$$ZrO_2 + 2C + 2Cl_2 \rightarrow ZrCl_4 + 2CO$$

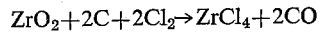

This reaction is initiated by charging a reactor with pellets consisting essentially of a mixture of zirconium oxide and carbon to form a static bed of the pellets in the reactor, raising the temperature of the pellet bed to about 500° C. and then admitting chlorine. Since the reaction is exothermic, heat is liberated, thereby increasing the temperature of the reaction zone in the pellet bed by 300° C. to 600° C. or more. Once the reaction has been initiated the free energy of the reaction, released as heat, is sufficient to maintain the reaction zone at chlorinating temperatures so that external heating of the reactor may be discontinued and the reaction is thermally autogenic.

The term "thermally autogenic," as used herein, refers to a reaction wherein the heat produced in a reaction zone per unit of time is not less than the heat loss from the reaction zone per unit of time at the temperature of the reaction.

This invention provides an efficient method for the thermally autogenic chlorination of a refractory oxide, by using solid input materials of controlled size and composition and in highly reactive form, and by conducting the chlorination in equipment that radiates less energy than the available heat energy that is produced by the chlorination.

In order to attain the desired objectives of improved reaction rate, substantially complete consumption of all reactants and thermally autogenic reaction of the chlorination process of this invention it is necessary to carefully control the size and composition of the pelleted solid reactants. Thus it is essential that the size of the pellets be within certain critical limits and that the composition of the pellets be very carefully controlled.

SIZE OF PELLETS

According to the present invention the carbon and the refractory oxide to be chlorinated, each in a finely divided state are formed into pellets. The pellets must have a particle size in the range of from about 1 mm. to about 11 mm., in diameter. It is preferred that the pellets have diameters predominantly within the range of from about 2 mm. to about 5 mm.

Since the chlorination reaction occurs between a gas and two solids, the rate of reaction is, to a large extent, controlled by the surface area of the solids with which the gas can come into contact. To achieve the objectives of this invention it is necessary that the solid reactants possess a much larger ratio of surface area to mass than is possible with the briquettes that have been employed in the past.

By way of comparison, and neglecting internal surface area of the solid materials because of inherent porosity, one liter of briquettes produced in a Belgian Roll machine offers a surface area of about 170 cm.$^2$; whereas a liter of spherical pellets, having an average diameter of about 6 mm. presents a surface area on the order of about 10,000 cm.$^2$; and a liter of pellets having an average diameter of about 3 mm. presents a surface area on the order of about 20,000 cm.$^2$. These figures indicate the desirability of having the solid materials, with which the chlorine comes into contact, in the form of relatively small particles so that maximum surface area is available.

However, as the pellet size decreases and the surface area increases, the resistance to gas flow also increases. As a result the size of the pellets must be maintained above about 1 mm. diameter. With a bed of pellets of an average diameter of less than about 1 mm., the back pressure in the chlorinator becomes large and the flow of chlorine is restricted, thereby reducing the output of the chlorination process to a level which is unsuitable for commerical operation. When the flow of chlorine is restricted in this manner the reaction occurs in a very thin layer of the bed and the temperature in this small reaction zone is extremely high. Thus, while it is known that increasing the surface area of a solid reactant in a solid-gas reaction will result in an increased reaction rate, this principle must be somewhat restricted in the present invention. Accordingly in the process of this invention the pellets must have a minimum particle size of about 1 mm. in diameter in order to be suitable.

A bed of large pellets, that is about 12 mm. diameter and above, offers only slight resistance to chlorine flow. Because the surface area of such particles is comparatively small, the reaction zone tends to become too large and the heat of reaction is distributed over a larger mass of material. As a result the chlorine is no longer completely consumed in the reaction and is wasted and the reaction ceases to be thermally autogenic.

An even less desirable condition exists when a mixture of large pellets (i.e., above about 12 mm. diameter) and small pellets (i.e., less than about 1 mm. diameter) is used. When such a mixture of pellet sizes is charged to the reactor the small pellets fill the voids between the large pellets with the result that the back pressure becomes extremely high for even small chlorine flows, and the reaction zone is large and irregular. As a result the production rate is so severely limited as to be completely unfeasible.

These difficulties are avoided when the pelleted reactants have a particle size in the range of from about 1 mm. to about 11 mm. in diameter.

COMPOSITION OF PELLETS

One of the problems encountered in chlorination processes used heretofore is the accumulation of an ash or residue at the base of the reactor during chlorination. This residue contains non-volatile materials, principally magnesium and calcium chlorides, which are formed during the chlorination process. The formation of such non-volatile compounds occurs due to the presence of impurities in the materials charged to the reactor. The residue may also contain unreacted oxide or carbon. Thus when an excess of either the refractory oxide or the carbon is charged to the reactor the unreacted oxide or carbon will accumulate at the base of the bed in the reactor. The accumulation of such a residue of non-volatile impurities and/or unreacted oxide or carbon is a serious disadvantage interfering with the continuous operation of the chlorination process. When this occurs the reaction must be stopped, the reactor allowed to cool and the residue removed from the reactor.

Furthermore if the solid reactants also contain impurities which are volatile at the temperature of chlorination, the volatile impurities will be carried off in the effluent gases. These impurities must be separated from the effluent gas in order to obtain the desired chloride.

It has now been discovered that these problems may be overcome by carefully controlling the composition of the solid reactants charged into the chlorinator. In order to avoid the problems of residue formation within the reactor and volatile impurities in the effluent gases it is necessary that the pellets be formed of relatively pure materials and that the pellets contain a refractory oxide and carbon in approximately stoichiometric proportions required by the equation:

$$MO_2 + 2C + 2Cl_2 \rightarrow MCl_4 + 2CO$$

in which M represents a suitable element. In the production of zirconium tetrachloride, for example, stoichiometric proportions of zirconium dioxide to carbon, in accordance with the above equation, are 123 parts of zirconium dioxide to 24 parts of carbon. All references to parts and percentages herein are parts and percentages by weight. The use of substantially pure reactants together with stoichiometric amounts of reactants provides complete consumption of reactants and thereby eliminates the problems of residue removal from the chlorinator and impurities in the effluent gas. While the reactants need not be 100 percent pure, they must be relatively free of undesirable impurities. Therefore various impure oxidic ores containing substantial amounts of impurities may not be used in this invention, for the objects and advantages of this invention cannot be attained when such impure ores are used.

This interdependency of the character of the reactants and pellet size range is necessary for producing a commercially practicable, thermally autogenic, static bed chlorination process.

According to one preferred method of this invention for making a pelleted input material for the chlorination of a refractory oxide, such as zirconium oxide, finely divided zirconium dioxide and carbon, in substantially stoichiometric proportions are thoroughly mixed in the dry state. All of the particles preferably should be 325 mesh and finer (44 microns and finer). Pellets made with coarser material have less strength and tend to produce excessive dusting in chlorination. The mixed fine particles are then mixed with water in a ribbon mixer and preferably a small amount of a dispersing agent is employed. After thorough mixing of the water with the dry ingredients, the moist mixture is transferred a a rotary mixer and rolled in order to form the mix into pellets. Pellet formation is expedited by the addition of small amounts of dry mix to the mixture up to a total amount of about one-quarter of the dry weight of the mixer charge. The pellets are dried at about 110° C. to a moisture content of less than about 0.1 percent in an industrial drier.

Usually it is beneficial to incorporate, in the moist mixture, small amounts of a temporary binder, to increase the strength of pellets. This can be accomplished by adding, for example, 1 percent, based on the dry weight of zirconium dioxide in the mixture, of a material such as dextrin, polyvinyl alcohol, or other like temporary binder. Because of the nature of the reaction in which the pellets participate, the temporary binder should be selected so that the binder is free from undesirable residues. When the zirconium tetrachloride is to be employed for the production of zirconium for applications where low thermal neutron absorption cross section is important, the temporary binder should be selected carefully so that it does not introduce materials with high thermal neutron absorption cross section.

To insure that all of the pellets are within the required particle size range, they may be screened and both fines and large sizes may be returned to the ribbon mixer for reprocessing. The screened pellets are transferred to a storage bin from which they are charged to the chlorinator.

Figure 2:
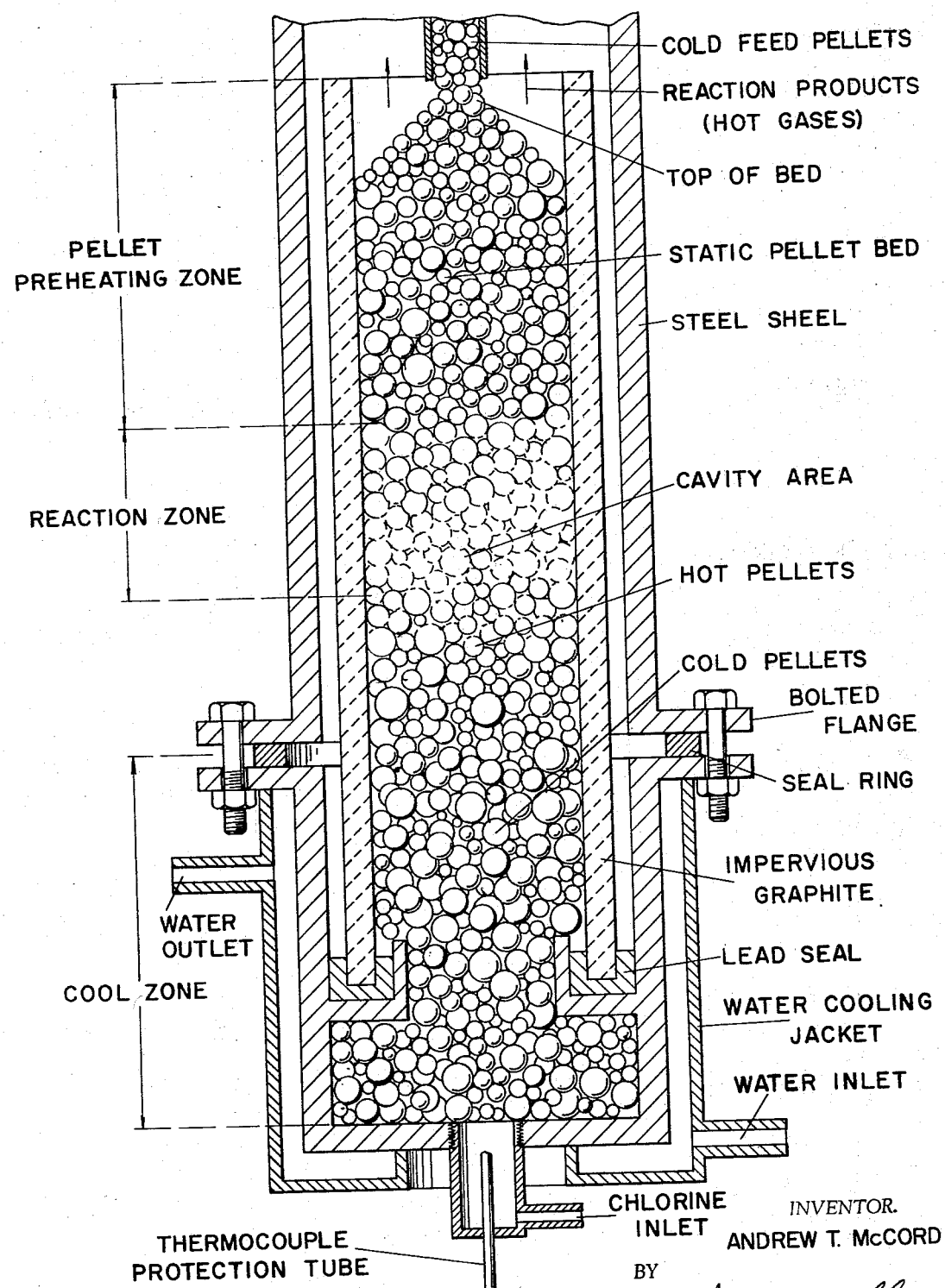

In the drawings:

FIG. 1 is a schematic diagram, partly in elevation, partly in section, of pellet bed chlorination equipment that is constructed in accordance with one embodiment of this invention, and FIG. 2 is a schematic axial section, on an enlarged scale, of the reaction chamber, showing one conception of the appearance of the pellet bed during a chlorination process.

Referring now in detail to the drawings, all the essential features of the chlorinator are shown in FIG. 1.

An impervious graphite, or porcelain, or other chlorine and temperature resistant and gas tight tube 10 is mounted inside a steel or stainless steel tube 11, and supported in a lead filled annular channel 12 built inside a water cooled jacket 14. Water enters this jacket at 16 and exits at 17. Through an entrance fitting 18 in the bottom of the jacket 14, a thermocouple protection tube 21, enters the body of the chlorinator. This entrance fitting 18 is also connected to a pipe 22, to provide means for feeding chlorine to the chlorinator.

The steel tube 11 is surmounted by an enlarged section 24 which acts as a dust trap. The entire assembly fits into and rests upon an annular furnace 25 which in turn rests upon a flat support 26. The furnace is gas fired through a port 27 and furnace gases exit through a port 28. This furnace may be heated also by oil or electricity. The enlarged section 24 possesses an exit port 29 through which the products of chlorination are led to whatever operation is contemplated.

A feed bin 31, which is gas-tight, contains feed pellets which fall by gravity through the valve 32, down the feed tube 34, and fill up the chlorinator until the level reaches the bottom of the feed pipe, when flow ceases. A small line 36 carries nitrogen gas under slight pressure into the feed line 34 to prevent chlorides rising to the feed line, condensing and preventing the feed from flowing freely.

After the chlorinator is loaded the furnace is turned on, and when the temperature of the pellet bed near the base of the furnace reaches 500–550° C., chlorine is admitted to the chlorinator through the line 22. As the pellets are consumed, more fall into the equipment to maintain the level in the tube 10.

The chlorine reacts with the first pellets that it comes into contact with at a temperature of at least about 500° C. The reaction that occurs is exothermic and for each gram-mole of zirconium tetrachloride that is formed, in the chlorination of zirconium dioxide, assuming an initial chlorine temperature of 25° C. and pellet temperature of 500° C., the heat of formation, which is equivalent to −34.05 kilocals., becomes available. A reaction zone is formed that is about 1″ to 1½″ deep, and within the temperature tends to level off within a few minutes.

Cooling water is passed continuously through the jacket 14 at the lower end of the tube 11, to cool the tube adjacent the reaction zone. The lower end of the chlorinator therefore remains approximately at room temperature. The pellets in this zone remain cool and act as a support for the pellets above. Immediately beneath the reaction zone, as shown in FIG. 2, some of the pellets in this lower zone are heated and form a relatively thin layer of hot pellets. The chlorine that enters the reactor remains cool, and therefore non-corrosive, until it encounters the layer of hot pellets. The pellets in the cool zone of the reactor are sufficient support for the pellets above in the heated portion. A screen or porous ceramic plate may also be used to support the pellets.

The gaseous reaction products consisting essentially of zirconium tetrachloride and carbon monoxide, at the temperature of the reaction zone, leave the reaction zone and pass upwardly through the pellets that are above the reaction zone. According to prefered practice of this invention, sufficient heat transfer occurs to maintain the pellets at the top of the tube 10 at a temperature of about 500° C. Therefore, as soon as the reaction zone is established the furnace need not be operated, since the reaction becomes thermally autogenic.

The zirconium tetrachloride may be recovered as a high purity powder by separating dust from the hot product gases, then cooling these gases to condense the zirconium tetrachloride as a solid powder. The chloride may be condensed in a water-cooled condenser with a condenser-shell temperature of about 100° C.

In the production of zirconium tetrachloride, when the pellets contain stoichiometric amounts of zirconium dioxide and carbon, the reaction zone will remain intermediate the ends of the tube 10. As shown schematically in FIGURE 2 the static bed of pellets in the chlorinator consists of three zones: a lower supporting zone, an intermediate reaction and an upper heat exchange zone. If the amount of carbon in the pellets is either too high or or too low as is common in chlorination processes used heretofore, there tends to be an accumulation or carbon or oxide respectively, within tube 10. This accumulation occurs in the lower portion of the tube and forces the reaction zone up to a higher level within the tube. When this occurs the process must be stopped so that the unreacted and non-volatile materials can be removed. This undesirable feature is eliminated in the present invention by the use of stoichiometric amounts of reactants and relatively pure feed materials.

Thermodynamic data do not indicate the rate at which chlorination occurs, only the amount of heat available if the reaction does occur. However, experimental determinations indicate that the rate of chlorination of the pellet bed was extremely low at 400° C. and that 99 percent of the input chlorine gas passed through the pellet bed unchanged. At 500° C. the chlorination rate was high and all of the chlorine reacted in the reaction zone. Within ten minutes after beginning operations, the temperature of the reaction zone increased to about 800° C. to about 1000° C.

The rate at which the reaction progresses can be controlled to some extent by adjusting the rate of chlorine into the reaction zone. For an autogenic reaction the minimum flow rate of chlorine is that which will produce sufficient reaction heat to balance radiation losses, while the maximum rate for any chlorinator is governed by the permissible quantity of dust that can be carried over with the gaseous products. For a reactor having a six-inch inside diameter very satisfactory results have been obtained with flow rates varying from about 5 pounds of chlorine per hour to about 30 pounds of chlorine per hour.

The gas velocities through the bed must, of course, be less than that required to fluidize the bed. The theoretical gas velocities, as calculated on the basis of an empty chlorinating tube of 6" internal diameter, for production of zirconium tetrachloride at the rate of 50 pounds per hour, are as calculated below:

| | Feet per second |
|---|---|
| Chlorine velocity | 0.244 |
| Product gases at 800° C. | 1.32 |
| Product gases at 500° C. | 0.94 |

To increase the production rate, for example, to 100 pounds per hour of zirconium tetrachloride, which is close to the maximum for a chlorination tube of this size, the gas velocities are doubled.

By way of contrast, for pellets of zirconium oxide and carbon of the same general type used in this chlorination process, and having sizes in the range 0.6 cm. to 0.2 cm., the minimum fluidizing velocity of the chlorine must be in the range from about 2 ft. per second up to about 4.5 ft. per second.

The examples of the invention described below are given for illustrative purposes only, it not being intended to limit the procedure to the details specified since the pelleted input material and the process and apparatus in which they are used can be varied somewhat without departing from the spirit or scope of the invention.

Example I

A pelleted feed material of zirconium oxide and carbon was prepared in the following manner. An intimate admixture of finely divided zirconium dioxide (325 mesh and finer) and finely divided carbon was prepared. To this dry mix, a polymerized alkyl aryl sulfonate dispersing agent, water and a small amount of dextrin as a temporary binder were added to form a pasty mass. The composition of this pasty mass was:

| Ingredient: | Amount |
|---|---|
| Micropulverized zirconium dioxide | lbs 128 |
| Carbon | lbs 25 |
| Water with dispersant | gals 6 |
| Dextrin | lbs 1.5 |

The amount of water required to form the pasty mass may vary when different oxides or various forms of carbon are used.

A part of the mass was placed in a large diameter rotary mixer, and another part of the mass was placed in a rotary mixer of smaller diameter. A dry mix of the oxide and carbon was slowly added in small increments to both mixers. Up to one-quarter of the original weight of the oxide and carbon was used. Pellets formed in both mixers in about 30 minutes. The pellets were quite hard. They were screened to separate oversize and fines, then dried on trays at 110° C. The dried pellets were subjected to screen analysis. The results of the analysis are summarized below in Table I.

TABLE I.—SIZE DISTRIBUTION OF PELLETS

| Size Range | From Large Diameter Mixer, Weight percent | From Small Diameter Mixer, Weight percent |
|---|---|---|
| 0–1.2 mm | 0.43 | 3.54 |
| 1.2–1.7 mm | 3.09 | 3.71 |
| 1.7–2.2 mm | 15.61 | 16.74 |
| 2.2–3.5 mm | 43.53 | 44.45 |
| 3.5–5.0 mm | 30.53 | 23.45 |
| 5.0–11.0 mm | 6.94 | 8.11 |

The dried pellets were substantially dust-free, were strong, and were characterized by uniformly block surfaces. As indicated by screen analysis, over 80 percent of the pellets, from both mixers, were in the size range 2 mm. to 5 mm. The pellets flowed freely through pipes and valves.

Example II

A pelleted hafnium oxide-carbon feed material was prepared in the following manner. A mixture was prepared from finely divided carbon, finely divided hafnium oxide, a small amount of a polymerized alkyl aryl sulfonate dispersing agent in water and 1 percent, based on the hafnium oxide, or dextrin as a temporary binder. The amount of hafnium oxide and carbon in the mixture was approximately the stoichiometric amount required to form hafnium tetrachloride and carbon monoxide. The moist mass was pelleted in a large mixer. The pellets were screened to separate fines and oversizes and dried on trays at 110° C. until no further loss in weight was recorded. The pellets were then subjected to a screen analysis and the results summarized in Table II.

TABLE II.—SIZE DISTRIBUTION OF PELLETS

| Size range, mm.: | Weight percent |
|---|---|
| 0–1.2 | 0.05 |
| 1.2–2.5 | 3.85 |
| 2.5–3.5 | 7.95 |
| 3.5–5.5 | 38.05 |
| 5.5–11.2 | 50.1 |

It has been found that the size range of the pellets can be controlled by adjusting the moisture content of the moist mix and the speed of rotation of the rotary mixer.

Example III

Zirconium tetrachloride was produced, according to the present invention, in the following manner.

A pelleted input material, consisting essentially of 270 pounds of finely divided zirconium oxide and 50 pounds of finely divided carbon, was prepared according to the method of Example I, the pellets having a diameter between 1–11 mm. A chlorination apparatus of the type described in detail above and shown in FIGURE 1 was used, the chlorinator having an impervious graphite chlorinating tube with an internal diameter of 6". The chlorinator was charged with the pellets to a height of between about 18" and 24". A gas heater brought the temperature of the bed to about 550° C. and the chlorine flow was started. The chlorine did not react until it encountered the first particles at the elevated temperature. A reaction zone about 1" to 1½" in depth was established and in this portion of the reactor the temperature rose to about 800°–1000° C. within a few minutes. The external heating was then discontinued. The average chlorine flow was 16.7 pounds per hour, the zirconium tetrachloride production being 27.26 pounds per hour. This corresponds to 0.96 pound of zirconium tetrachloride per square inch cross section per hour. The chlorinaton was continued for 34.4 hours. The hot effluent gas passed upwards through the pellet bed, thereby heating the pellets above the reaction zone and was withdrawn from the chlorinator and passed to a water-cooled condenser in which zirconium tetrachloride was condensed from the gas streams.

Analysis of the product was:

| | Percent |
|---|---|
| $ZrCl_4$ | 98.62 |
| $ZrO_2$ | 1.38 |
| C | — |

At no time was any free chlorine present in the effluent gases. The gases usually contained no phosgene, and when chlorination occurred at 900° C. and above, very little carbon dioxide. The gases always contained a small amount of hydrogen chloride, which was easily removed with a water wash.

exceptionally strong particles are made by extruding, in a continuous fashion, a generally cylindrical rod of an intimate mixture of fine particles of: a refractory oxide, carbon, a dispersing agent, and a temporary binder such as polyvinyl alcohol. The pressure that is applied in the extruder compacts the mixture and produces a rod of unusually high density. As the rod is extruded it can be cut into short lengths that have approximately the same height as diameter. These stubby cylinders make excellent feed particles. To increase their surface area, they can be tumbled together with abrasive particles, or they can be pierced in a press, or otherwise slightly modified in shape, to take advantage of the extra strength that is the result of extruding, but to modify the extruded shape to increase the surface area, thereby to increase the rate of chlorination. The word "pellets" is used throughout to denote all such granules or particles of solid feed material.

The type of chlorinator that has been described in detail herein, for use in practicing the invention, can be heated externally as necessary. Because the chlorine is utilized completely, the construction can be of steel, and the danger of chlorine attack on heated metal is reduced. The equipment is so simple that it may be dismantled and replaced in a matter of hours. Brick lined chlorinators require days or weeks for replacement. Another important advantage is that a very low power input is required. A briquette chlorinator must heat the briquettes by resistance heating, which entails considerable expense and operating difficulties. The chlorinator described herein involves much less capital cost and much lower maintenance costs.

While this invention has been described in connection with specific embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

I claim:

1. A thermally autogenic method for the production of refractory metal chlorides from refractory oxides selected from the group consisting of zirconium, hafnium and mixtures thereof which comprises forming a bed of pellets consisting essentially of a mixture of finely divided refractory oxide and carbon in substantially stoichiometric proportions, said pellets having diameters in the range of from about 1 mm. and 11 mm. and being substantially free of non-reactive, non-volatile impurities, maintaining a reaction zone in said pellet bed at a chlorinating temperature, passing a chlorinating gas into said bed, while maintaining said bed under static conditions, for contact with said pellets, said chlorinating gas reacting with said pellets in said reaction zone to form gaseous reaction products whereby said pellets and said chlorinating gas are substantially completely consumed in said reaction, withdrawing said gaseous reaction products from said reaction zone and removing said refractory metal chloride therefrom.

2. A thermally autogenic method for the production of zirconium tetrachloride from zirconium oxide which comprises forming a bed of pellets consisting of a mixture consisting essentially of about 123 parts of finely divided zirconium oxide and about 24 parts of carbon, said pellets having diameters in the range of from about 1 mm. and 11 mm. and being substantially free of non-reactive, non-volatile impurities, maintaining a reaction zone in said pellet bed at a temperature of at least 500° C., passing chlorine gas into said bed while maintaining said bed under static conditions for contact with said pellets, said chlorine reacting with said pellets in said reaction zone to form volatilized zirconium tetrachloride whereby said pellets and said chlorine are substantially completely consumed in said reaction, and withdrawing said zirconium tetrachloride from said reaction zone.

3. A thermally autogenic method for the production of hafnium tetrachloride from hafnium oxide which comprises forming a bed of pellets consisting of a mixture consisting essentially of about 210 parts of finely divided hafnium oxide and about 24 parts of carbon, said pellets having diameters in the range of from about 1 mm. and 11 mm. and being substantially free of non-reactive, non-volatile impurities, maintaining a reaction zone in said pellet bed at a temperature of at least 500° C., passing chlorine gas into said bed while maintaining said bed under static conditions, said chlorine reacting with said pellets in said reaction zone to form volatilized hafnium tetrachloride whereby said pellets and said chlorine are substantially completely consumed in said reaction, and withdrawing said hafnium tetrachloride from said reaction zone.

References Cited by the Examiner

UNITED STATES PATENTS

| | | | |
|---|---|---|---|
| 2,084,289 | 6/1937 | McAfee et al. | 23—95 |
| 2,184,885 | 12/1939 | Muskat et al. | 23—87 |
| 2,369,212 | 2/1945 | Cooper | 23—205 |
| 2,401,544 | 6/1946 | Brallier | 23—87 |
| 2,805,120 | 9/1957 | Plant | 23—87 |
| 2,842,425 | 7/1958 | Anderson | 23—87 |
| 2,940,826 | 6/1960 | Anderson | 23—87 |
| 2,953,433 | 12/1960 | Newnham | 23—87 |

L. DEWAYNE RUTLEDGE, *Primary Examiner.*

BENJAMIN R. PADGETT, *Examiner.*

S. TRAUB, *Assistant Examiner.*